(12) United States Patent  (10) Patent No.: US 9,111,363 B2
Matsubara et al.  (45) Date of Patent: Aug. 18, 2015

(54) VIDEO PLAYBACK APPARATUS AND VIDEO PLAYBACK METHOD

(71) Applicant: Panasonic Intellectual Property Management Co., Ltd., Osaka (JP)

(72) Inventors: Akira Matsubara, Osaka (JP); Kazuhiko Maeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 30 days.

(21) Appl. No.: 14/064,253

(22) Filed: Oct. 28, 2013

(65) Prior Publication Data

US 2014/0286625 A1   Sep. 25, 2014

(51) Int. Cl.
| | |
|---|---|
| H04N 5/775 | (2006.01) |
| G06T 3/40 | (2006.01) |
| G11B 27/031 | (2006.01) |
| G06F 17/30 | (2006.01) |
| H04N 5/781 | (2006.01) |
| H04N 5/907 | (2006.01) |
| H04N 9/804 | (2006.01) |
| G11B 27/00 | (2006.01) |
| H04N 9/82 | (2006.01) |

(52) U.S. Cl.
CPC ............ *G06T 3/40* (2013.01); *G06F 17/30244* (2013.01); *G11B 27/00* (2013.01); *G11B 27/031* (2013.01); *H04N 5/775* (2013.01); *H04N 5/781* (2013.01); *H04N 5/907* (2013.01); *H04N 9/8042* (2013.01); *H04N 9/8205* (2013.01); *H04N 9/8227* (2013.01)

(58) Field of Classification Search
None
See application file for complete search history.

(56) References Cited

U.S. PATENT DOCUMENTS

| | | | |
|---|---|---|---|
| 8,526,804 B2 | 9/2013 | Morimoto | |
| 2006/0140580 A1* | 6/2006 | Hiroi et al. | 386/52 |
| 2008/0166025 A1* | 7/2008 | Thorne | 382/118 |
| 2010/0073546 A1 | 3/2010 | Mori | |
| 2010/0074557 A1 | 3/2010 | Oku et al. | |
| 2011/0058100 A1* | 3/2011 | Muto | 348/445 |
| 2011/0243538 A1 | 10/2011 | Morimoto | |
| 2011/0255845 A1* | 10/2011 | Kikuchi | 386/278 |
| 2011/0285764 A1* | 11/2011 | Kimura et al. | 345/697 |

FOREIGN PATENT DOCUMENTS

| | | |
|---|---|---|
| JP | 2007-074503 | 3/2007 |
| JP | 2007-251429 | 9/2007 |

(Continued)

*Primary Examiner* — William C Vaughn, Jr.
*Assistant Examiner* — Eileen Adams
(74) *Attorney, Agent, or Firm* — Wenderoth, Lind & Ponack, L.L.P.

(57) ABSTRACT

A video playback apparatus that processes an obtained video and plays back the processed video, includes: a face recognition unit which detects the size and position of an image of a person in the video, which change over time; a generation unit which generates a playback video for playback, such that the image of the person shown in the playback video is of a predetermined size, by (i) determining a clipping range for a part of the video in response to a change in the detected position, and (ii) enlarging or reducing, in response to a change in the detected size, a partial video which is the part of the video shown in the clipping range; and a video playback unit which plays back the generated playback video. Here, the response time for the clipping range determination is longer than a response time for the partial video enlargement or reduction.

3 Claims, 17 Drawing Sheets

(56) References Cited

FOREIGN PATENT DOCUMENTS

| | | |
|---|---|---|
| JP | 2008-252711 | 10/2008 |
| JP | 2010-081181 | 4/2010 |
| JP | 2011-223140 | 11/2011 |
| JP | 2012-175207 | 9/2012 |

\* cited by examiner

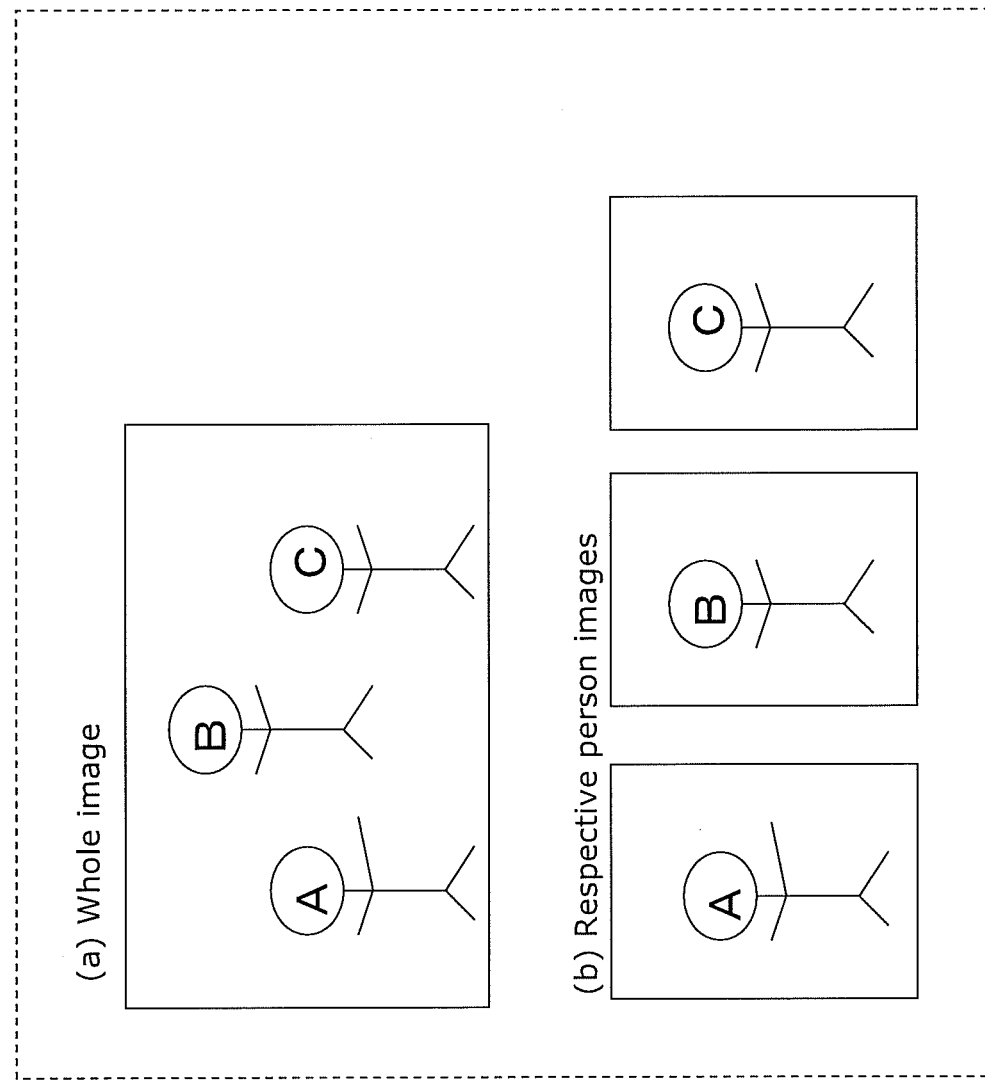

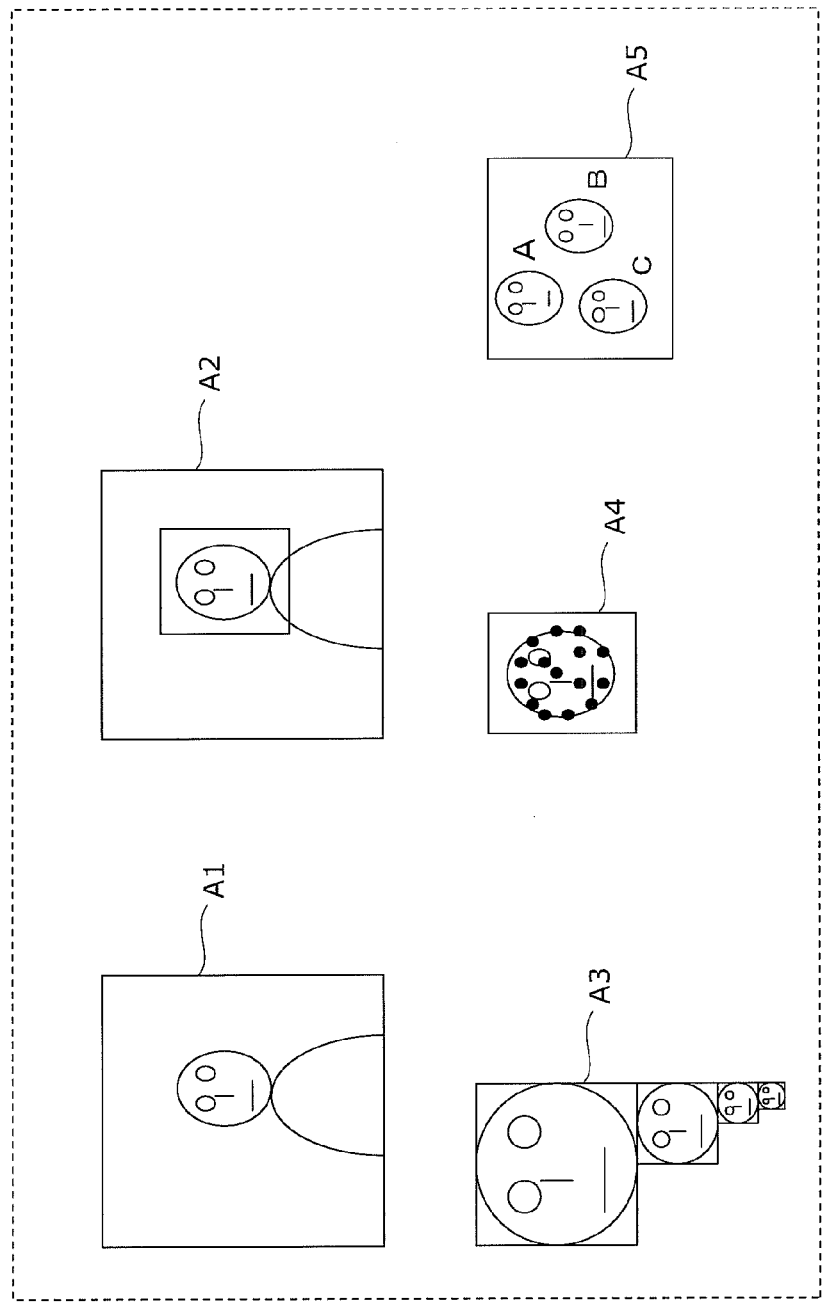

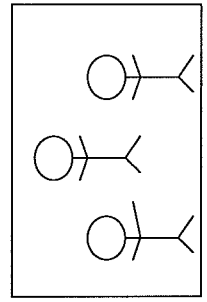
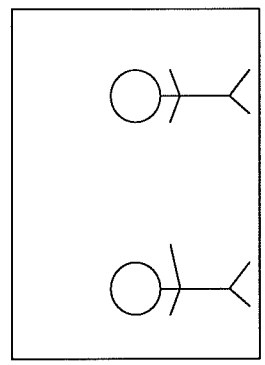
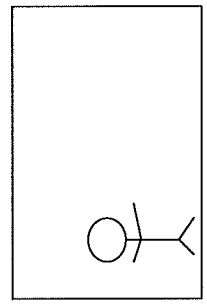
FIG. 7

FIG. 8

(Focused playback: Effect selection)

| Enlarged playback Large |
| Enlarged playback Medium |
| Enlarged playback Small |
| Name display |
| Spotlight |
| ...... |

VIDEO PLAYBACK APPARATUS AND VIDEO PLAYBACK METHOD

CROSS REFERENCE TO RELATED APPLICATION

The present application is based on and claims priority of Japanese Patent Application No. 2013-061416 filed on Mar. 25, 2013. The entire disclosure of the above-identified application, including the specification, drawings and claims is incorporated herein by reference in its entirety.

FIELD

The present disclosure relates to a video playback apparatus which performs processing on an obtained video and plays back the video after the processing.

BACKGROUND

Patent Literature (PTL) 1 discloses an image processing apparatus. This image processing apparatus detects the face portion of a subject of an input image, synthesizes an image of an extracted face portion and an image obtained by enlarging or reducing a clipped part of the input image, and displays the synthesized image.

Furthermore, Patent Literature (PTL) 2 discloses a moving picture editing apparatus which obtains the position of a target from an input image and keeps the target within a clipping frame.

CITATION LIST

Patent Literature

[PTL 1] Japanese Unexamined Patent Application Publication No. 2010-81181
[PTL 2] Japanese Unexamined Patent Application Publication No. 2007-74503

SUMMARY

Technical Problem

The present disclosure provides a video playback apparatus capable of performing appropriate clipping of a subject with respect to an inputted video (moving picture), and displaying an enlarged or reduced image of the clipped subject to thereby present a user with video having strong impact reminiscent of good camerawork, and so on.

Solution to Problem

In one general aspect, the techniques disclosed here feature a video playback apparatus that performs processing on an obtained video and plays back the video after the processing, the video playback apparatus including: a detection unit configured to detect a size and a position of an image of a person appearing in the video, the size and the position changing over time; a generation unit configured to generate a playback video that is to be played back, in such a way that the image of the person to be shown in the playback video is of a predetermined size, by (i) determining a clipping range for a part of the video in response to a change in the detected position of the image of the person, and (ii) enlarging or reducing a partial video in response to a change in the detected size of the image of the person, the partial video being the part of the video shown in the clipping range; and a playback unit configured to play back the playback video generated by the generation unit, wherein a response time for the determination of the clipping range by the generation unit is longer than a response time for the enlargement or the reduction of the partial video.

Advantageous Effects

The present disclosure can provide a video playback apparatus capable of processing video captured using, for example, a home video camera, to thereby present a user with video having strong impact reminiscent of good camerawork, and so on.

BRIEF DESCRIPTION OF DRAWINGS

These and other advantages and features will become apparent from the following description thereof taken in conjunction with the accompanying drawings, by way of non-limiting examples of embodiments disclosed herein.

FIG. 3 is a diagram showing an example of thumbnails outputted by the video playback apparatus.

FIG. 4B is a schematic diagram of face data, and the like, for describing a process performed by the face recognition unit.

FIG. 7 is diagram showing an example of thumbnails used in the selection of a playback lead scene.

FIG. 8 is a diagram showing an example of an effect selection screen outputted by the video playback apparatus.

DESCRIPTION OF EMBODIMENTS

Hereinafter, exemplary embodiments shall be described in details with reference to the drawings where appropriate.

However, there are instances where overly detailed description shall be omitted. For example, there are cases where detailed description of well-known matter or overlapping description of substantially identical elements shall be omitted. This is in order to prevent the subsequent description from becoming overly verbose and to facilitate the understanding of a person of ordinary skill in the art.

It should be noted that the accompanying drawings and the subsequent description have been provided by the inventors in order for a person of ordinary skill in the art to sufficiently understand the present disclosure, and thus they are not intended to limit the scope of the subject matter of the appended Claims.

Embodiment 1

A video playback apparatus in Embodiment 1 of the present disclosure shall be described with reference to the drawings.

[Outline of Video Playback System]

A video capturing and video playback system in Embodiment 1 shall be described.

Figure 1:
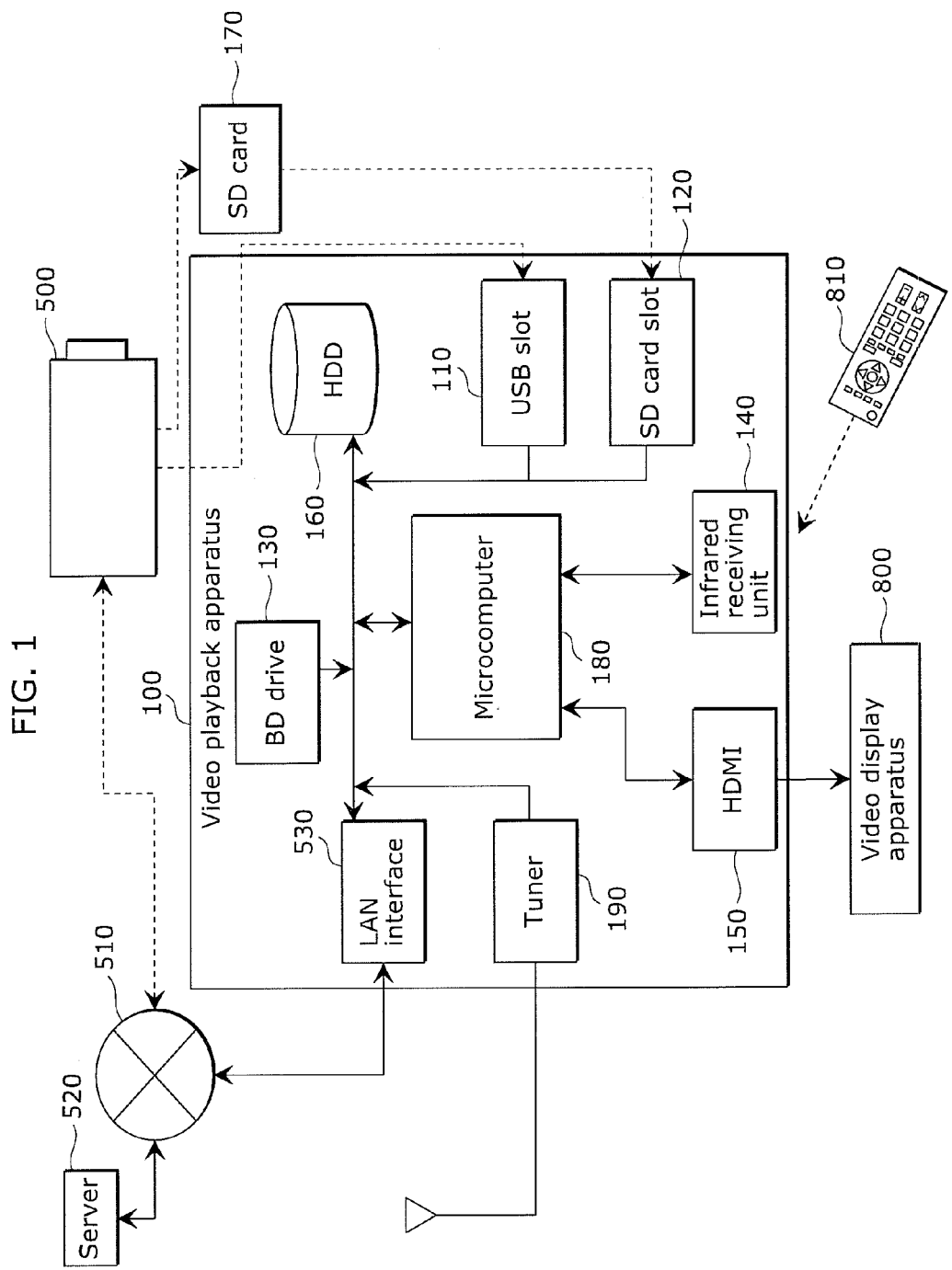
FIG. 1 is an overall configuration diagram of a video playback system in Embodiment 1.

FIG. 1 is an overall configuration diagram of a video playback system including a video camera 500, in Embodiment 1.

In FIG. 1, video captured by the video camera 500 is stored as video data in a server 520, via a network 510.

A video playback apparatus 100 obtains the video captured by the video camera 500, plays back (reproduces) the video, and displays the video on a video display apparatus 800 which is a television, a tablet terminal, or the like, via a High Definition Multimedia Interface (HDMI) 150.

The video display apparatus 800 includes an HDMI 150-compliant signal input unit, and displays the video inputted via the HDMI 150 on a screen.

The video data stored in the server 520 is moved to or copied in a hard disk drive (HDD) 160 (recording device) of the video playback apparatus 100, via the network 510, then via a local area network (LAN) interface 530 included in the video playback apparatus 100.

Aside from the aforementioned HDD, a memory device, for example, can also be used as the recording device. Furthermore, in this embodiment, the video inputted to the video playback apparatus 100 is compressed in order to reduce the volume of the video to be stored, and stored in the HDD 160. However, the video may also be stored in the HDD 160 as video data of a baseband signal, which is the uncompressed, raw captured video.

Furthermore, it is also possible to connect the video camera 500 directly to the video playback apparatus 100 by USB, and move or copy the video data of the captured video to the video playback apparatus 100 via a USB slot 110. Furthermore, it is also possible to record the video data on a portable recording medium such as an SD card 170 using the video camera 500, and move or copy the video data recorded on the SD card 170 to the video playback apparatus 100, via an SD card slot 120 of the video playback apparatus 100.

In addition, the video captured by the video camera 500 may be provided as a broadcast content item, received by the video playback apparatus 100 via a tuner 190, and stored in the video playback apparatus 100. Furthermore, the video captured by the video camera 500 may be recorded on an optical disc or the like and inputted from a BD drive 130.

The video captured by the video camera 500 is stored as video data in the HDD 160 of the video playback apparatus 100, using the various methods described above.

The video playback apparatus 100 may be integrated with, for example, the video camera 500, the server 520, or the video display apparatus 800. However, in the video playback system in Embodiment 1, description shall be carried out with the video playback apparatus 100 existing on its own.

[Configuration of the Video Playback Apparatus 100]

In the video playback apparatus 100, an instruction transmitted from a remote control 810 operated by a user is received by an infrared receiving unit 140. The instruction is forwarded to an internal microcomputer 180 via the infrared receiving unit 140.

Based on the instruction of the user, the microcomputer 180 controls the respective blocks in the video playback apparatus 100 to execute processes such as storing video data in the HDD 160, retrieving video data from the HDD 160, outputting video to the HDMI 150, and so on.

[Functional Configuration of the Microcomputer 180]

Figure 2:
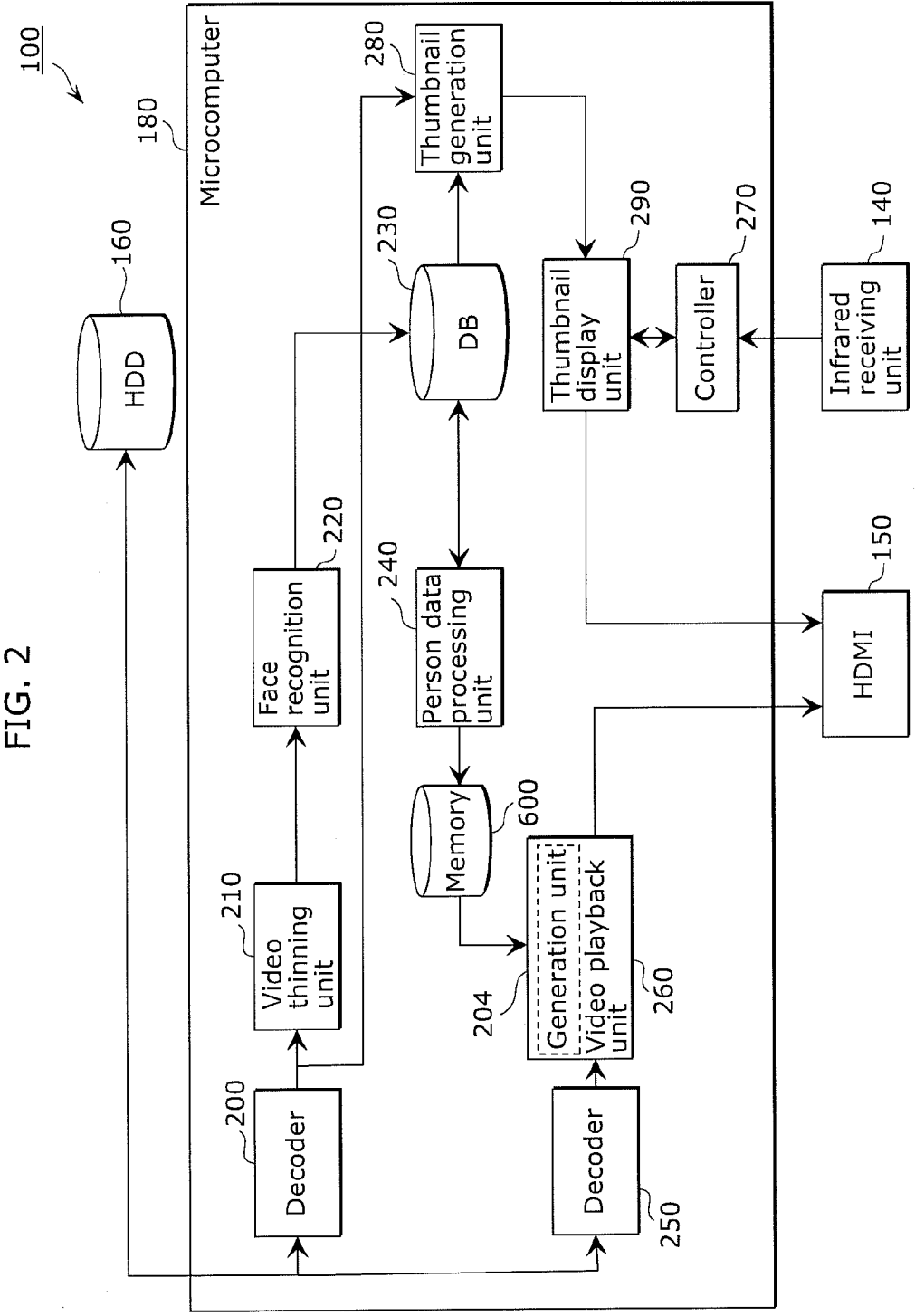
FIG. 2 is a block diagram showing a functional configuration of a microcomputer in Embodiment 1.

FIG. 2 is a block diagram showing the functional configuration of the microcomputer 180 in Embodiment 1. Specifically, in FIG. 2, the microcomputer 180 is illustrated by being separated into respective blocks for each function.

The microcomputer 180 includes, as important function elements of the video playback apparatus 100, a face recognition unit 220, a generation unit 204, and a video playback unit 260. Hereinafter, the specific configuration, processes, and so on, of the microprocessor 180 shall be described.

Since the video data stored in the HDD 160 is compressed, the video data is decoded into a baseband moving picture by a decoder 250, and displayed on the video display apparatus 800 via the HDMI 150. With this, the video data can be viewed as a played-back video. The video is displayed as a 30-frame per second moving picture, for example.

It should be noted that the video playback unit 260 can perform processing such as clipping and enlarging on the video obtained from the decoder 250, and output the video after the processing, via the HDMI 150. The details of the processing carried out on the video by the video playback unit 260 shall be described later.

Furthermore, the video data stored in the HDD 160 is decoded by a decoder 200 and has one in every few frames thereof inputted to the face recognition unit 220 by a video thinning unit 210 in advance before being played back.

The face recognition unit 220 is an example of a detection unit, and detects the position and size of the face of a person appearing in the video represented by the video data. Here, the position and size of the face changes over time. It should be noted that the image of a "face", which is the target of the position and size detection by the face recognition unit 220, is an example of an image of a person (hereafter referred to as "person image").

The face recognition unit 220, in addition, classifies faces for each appearing person, recognizes the position and size of the face for each appearing person, and stores the data of the position and size of the face (face recognition data) in a database 230 which is configured of a memory. It should be noted that the database 230 also stores the association between the video playback time (the time from the start of playback) and the appearing person.

The face recognition data for each appearing person which is stored in the data base 230 is processed by a person data processing unit 240 according to, for example, an instruction from the user, and is inputted, via a memory 600, to the video playback unit 260 which plays back the video obtained through the decoding by the decoder 250. The data inputted to the video playback unit 260 is an example of target information and is used as coordinates for the clipping of partial video from input video and the enlargement or reduction of the partial video performed by the generation unit 204. Video generated through such processes performed by the generation unit 204 is played back by the video playback unit 260, and displayed by the video display apparatus 800, via the HDMI 150.

It should be noted that although in this embodiment the generation unit 204 which generates the video to be played back is included in the video playback unit 260 which plays back the generated video, the generation unit 204 may exist as a function block outside the video playback unit 260.

The microcomputer 180 of the video playback apparatus 100 further includes a thumbnail generation unit 280 and a thumbnail display unit 290. The thumbnail generation unit 280 stores, as a thumbnail, an image obtained from the frame at a chapter of the video decoded by the decoder 200, according to the face recognition data stored in the database 230. The thumbnail display unit 290 causes the video display apparatus 800 to display the thumbnail, by transmitting the thumbnail to the HDMI 150.

The thumbnail generation unit 280 generates (i) a thumbnail showing the whole image of the frame at the chapter of the video and (ii) thumbnails of respective persons (hereafter referred to as "person thumbnails") each clipped from the whole image and centering on the face detected by the face recognition unit 220. FIG. 3 is a schematic diagram showing such thumbnails.

A controller 270 controls the respective units included in the microcomputer 180, based on the user's instructions received via the remote control 810. The controller 270 can be configured of a processor such as a central processing unit (CPU) which interprets and executes software.

Figure 4A:
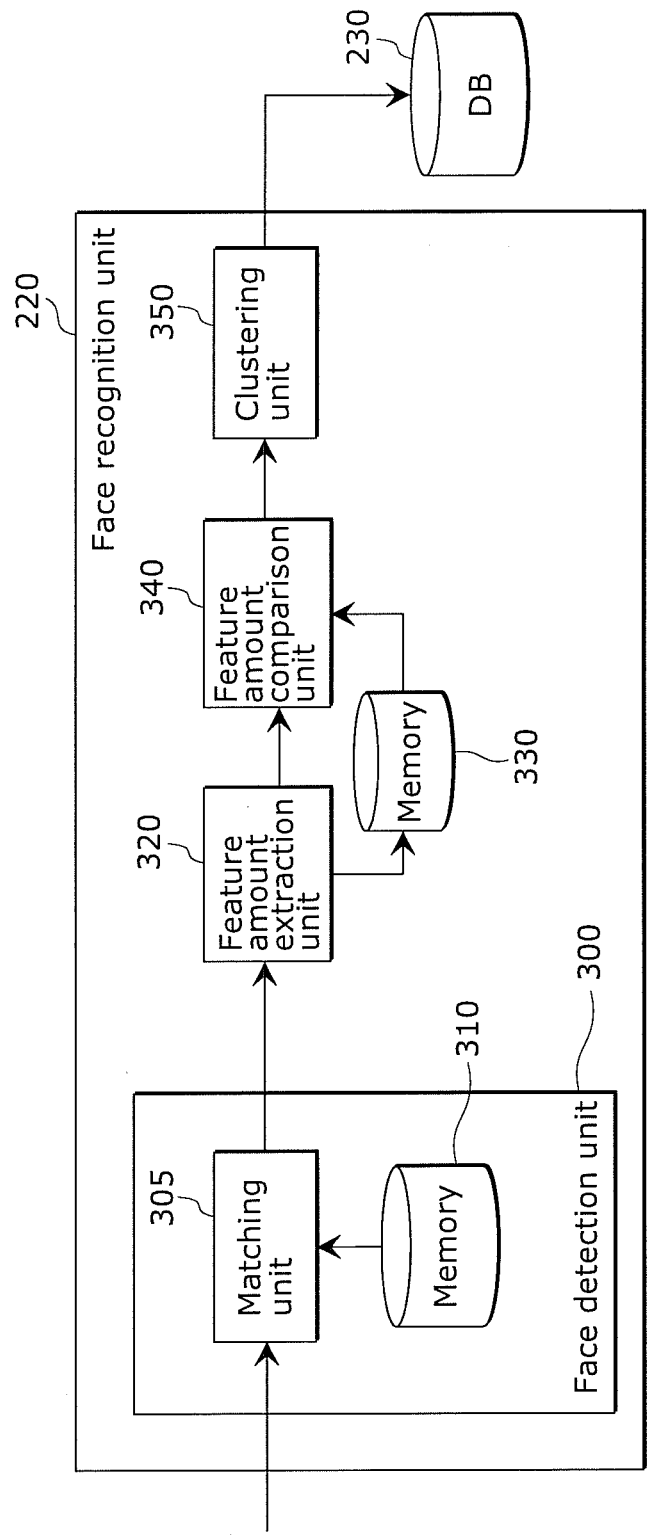
FIG. 4A is a block diagram showing a functional configuration of a face recognition unit in Embodiment 1.

FIG. 4A is a block diagram showing the functional configuration of the face recognition unit 220. FIG. 4B is a schematic diagram of the data of face images (face data) and so on for describing the process performed by the face recognition unit 220.

In FIG. 4A, a face detection unit 300 searches for a portion having features of a face, from inside the video (referred to here as an image (for example, one frame)) inputted to the face recognition unit 220. Face data items having plural sizes are stored in a memory 310 for the face detection unit 300, and the face detection unit 300 scans the entire search-target image and detects the position and size of a face by comparing plural face data items.

Since the scanning and comparison are performed over the entire search-target image, data items of predetermined sizes such as, for example, a size having a vertical and horizontal pixel count of 32 pixels×32 pixels, respectively, a size of 48 pixels×48 pixels, or the like, are used. The face detection unit 300 performs matching verification while shifting the overlapping position of the face data items and the search-target image.

In FIG. 4B, a schematic diagram of the input image is shown as A1 and a schematic diagram of the detection of the position and size of a face is shown as A2. A3 is a schematic view of face data items having different sizes, which are used for comparison.

A feature value for recognizing features of an individual is extracted by a feature value extraction unit 320 from a face detected by the face detection unit 300, and stored in a memory 330. A4 in FIG. 4B is a schematic diagram where black dots represent positions at which feature amounts are extracted, with respect to the position of the face obtained from A2.

From the feature amount data stored in the memory 330, the feature amount comparison unit 340 checks for a person (person "a") appearing in a past image and having a face that was detected from that image. As a result of the checking, the face corresponding to the feature amount data is (i) recognized as the face of person "a" when it is judged as being the same as the face of person "a" that was recognized in the past, and (ii) recognized as the face of a different person when it is judged as being a face different from that of person A. The feature amount comparison unit 340 assigns, to a detected face data item (A2), an ID (face ID) for each of the faces of the respective persons.

A clustering unit 350 consolidates the face IDs assigned by the feature amount comparison unit 340, and links each face data item to already-linked face data items of a corresponding one of the respective persons, through processing such as judging, using the image features, that, for example, a face recognized at the same position in the immediately preceding image is the face of the same person. In other words, plural face data items are clustered according to similarity, and the like. A5 in FIG. 4B is a schematic diagram representing clustered face data items (face images).

The clustering unit 350, in addition, stores data (face recognition data) indicating the positions and sizes of the face image of each person on a time-basis.

Specifically, the sizes and positions of a person image appearing in the video, which change over time, are detected, and data indicating the detected sizes and positions of the person image is stored in the database 230.

In this manner, in the video playback apparatus 100, the position and size of the face of each appearing person is obtained, and the position and size of the face of each appearing person is accumulated in the database 230 on an input image basis (i.e., each frame included in the input video) as face recognition data.

The operation of storing, in the database 230, the data of the chronologically-arranged series of positions and sizes of the face of each person is referred to as tracking.

[Description of Playback Content Selection Operation]

Next, the operation of playing back the video based on the face recognition data accumulated in the database 230 shall be described.

Figure 5:
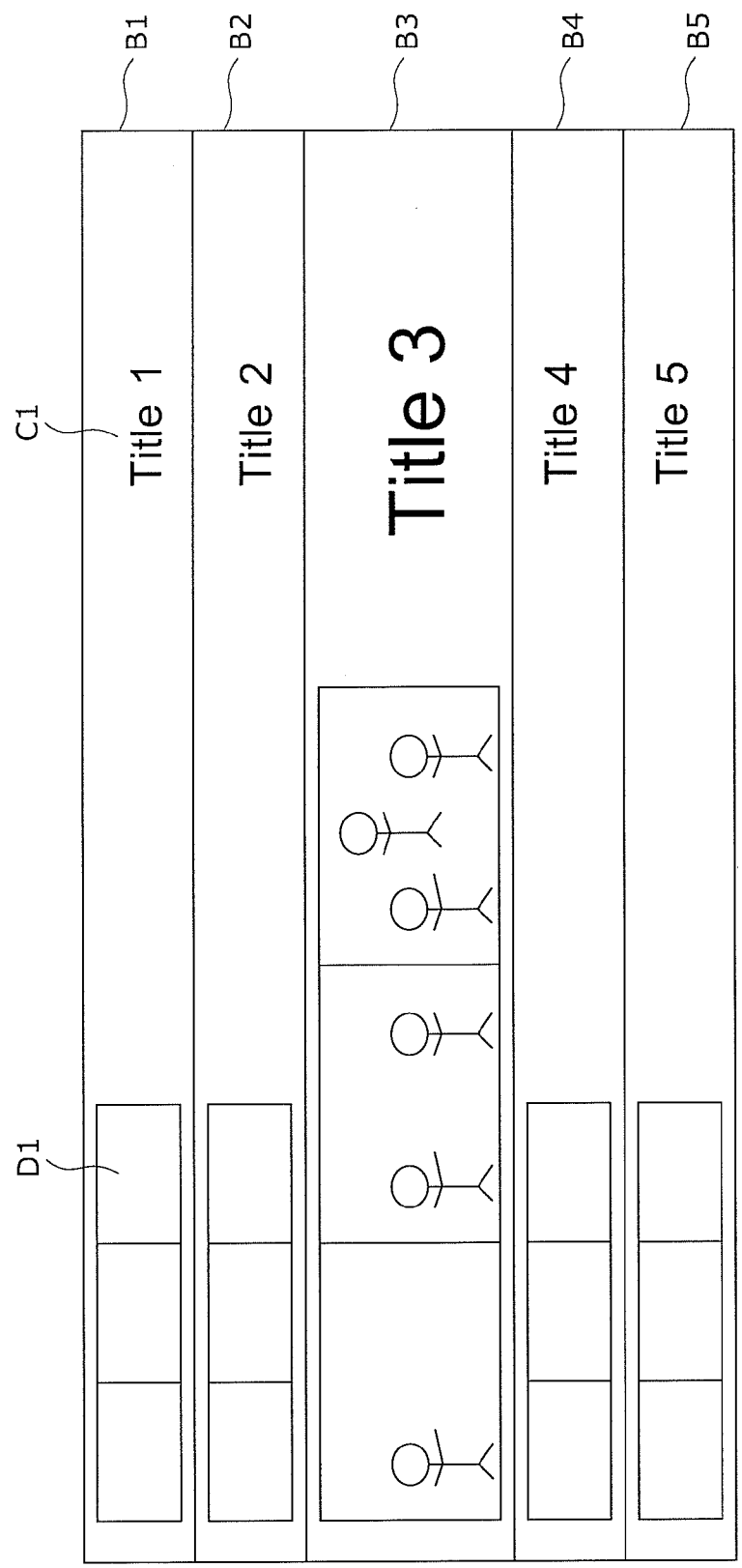
FIG. 5 is a diagram showing an example of a GUI generated by the microcomputer.

FIG. 5 is a diagram showing and example of a graphical user interface (GUI) generated by the microcomputer 180. The GUI generated by the microcomputer 180 is displayed on the video display apparatus 800 via the HDMI 150. While the GUI is displayed on the video display apparatus 800, the video playback apparatus 100 receives the user's playback instruction from the remote control 810, for example.

In FIG. 5, a list of titles (video titles) of the video content items stored in the HDD 160 is displayed in columns B1 to B5.

Each of the columns show a title C1 and a thumbnail D1 showing the playback scene.

In the GUI, the user can select a playback title by operating the remote control 810, and, as in column B3, a selected column is highlight-displayed by being displayed enlarged, for example.

The one or more thumbnails D1 in each column display an overall view of the video content item of that column.

Specifically, based on the results of the detection and recognition by the face recognition unit 220, each time one of plural persons appears in one video content item, a thumbnail D1 including that person is generated by the thumbnail generation unit 280. Furthermore, the respective thumbnails D1 that are generated are arranged chronologically and displayed in the column corresponding to the video content item.

In this manner, the user can find out the scene at which a person first appears in each video content item, through the thumbnails D1, and can play back the scene by selecting the corresponding thumbnail D1. In this manner, by relying on the GUI screen display shown in FIG. 5, the user can instruct the playback of a video content item, that is, select a playback content item.

A thumbnail D1 is generated each time a new appearing person appears, and thumbnails D1 of a number that is limited by the size of the column, for example, are displayed in the GUI shown in FIG. 5.

[Description of the Playback Operation]

Figure 6:
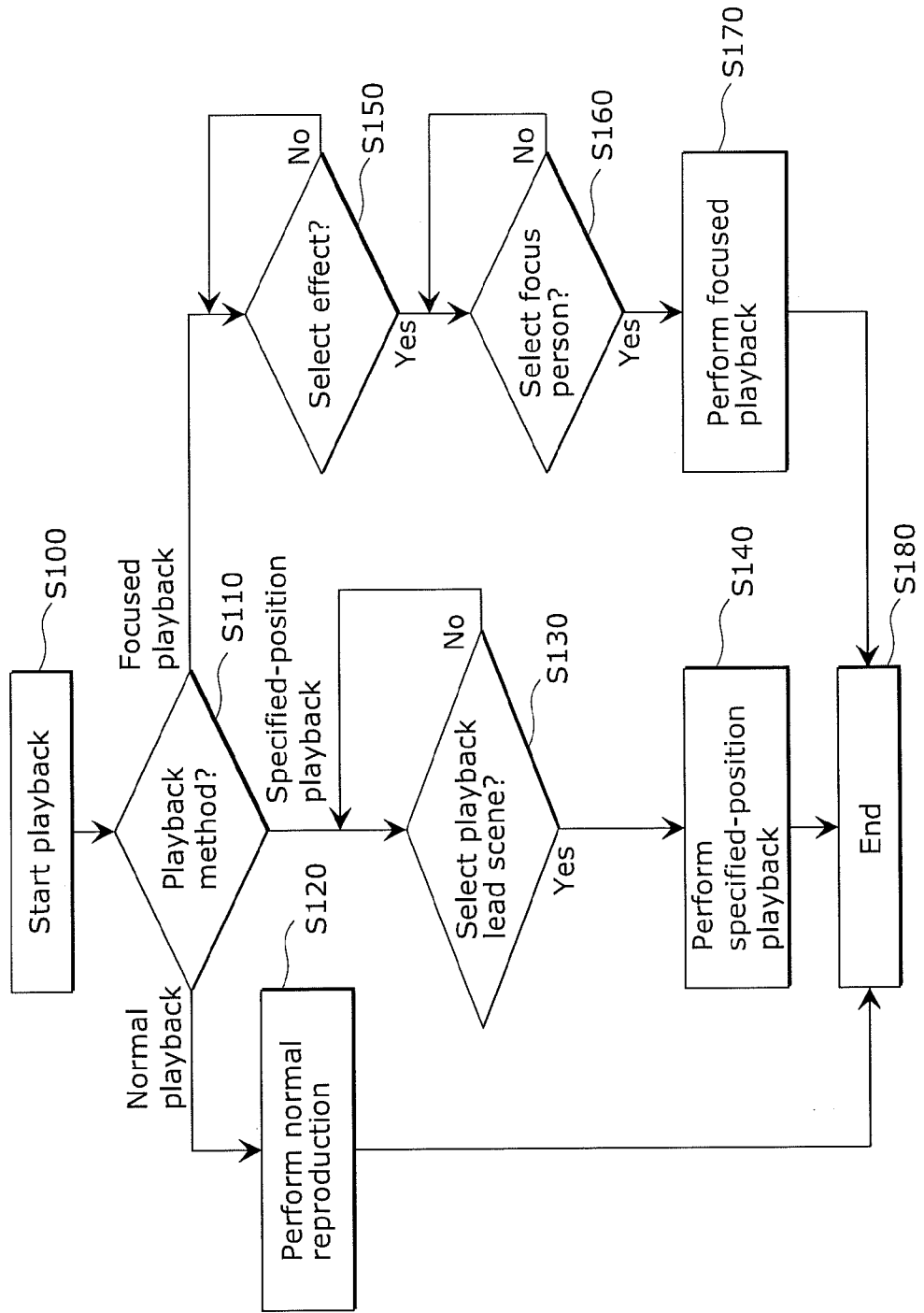
FIG. 6 is a flowchart showing the flow of operations when the video playback apparatus generates a video.

Next, description shall be carried out, with reference to FIG. 6, for the operation of the video playback apparatus 100 when the playback of a video content item (hereafter referred to simply as "video" or "content item") to be played back is performed by way of the user selecting the content and instructing the playback via the remote control 810.

FIG. 6 is a flowchart showing the flow of operation when the video playback apparatus 100 plays back video based on the face recognition data accumulated in the database 230.

In FIG. 6, the start of playback (S100) indicates that the content item to be played back has been selected. Next, the user selects a playback method through guidance using the GUI.

Playback methods include, for example, normal playback, specified-position playback, and focused playback.

[Normal Playback]

When the user selects normal playback ("normal playback" in S110), the video playback apparatus 100 performs playback (S120) from the start of the content item.

[Specified-Position Playback]

When the user selects specified-position playback ("specified-position playback" in S110), the user, relying on the thumbnails D1 in FIG. 5, and so on, subsequently specifies the position, in the content, from which playback should be started. With this, the video playback apparatus 100 starts playback from a position at which any one of the persons first appeared.

Specifically, in specified-position playback, when any one of the thumbnails D1 is selected, the content item is played back from the time of the scene corresponding to such thumbnail D1.

For example, as shown in FIG. 7, in the case where plural persons appear in the content item, each time any one of the persons appears, a thumbnail D1 showing the appearance scene is generated and displayed in the GUI (see FIG. 5).

By operating the remote control 810, the user can select any one of these thumbnails. Furthermore, a scheme is provided to facilitate the user's selection such as enlarged-display of the thumbnail D1 (for example, the central thumbnail D1 in FIG. 7) showing a lead scene from which playback is to be started, or the like, when the user puts the focus on the thumbnail using the remote control 810.

In this manner, when the user selects the playback lead scene (S130), the video playback apparatus 100 starts the playback from such lead scene, that is, starts the specified-position playback (S140). In this manner, the playback start position can be specified by having the user select a thumbnail. With this, the video playback apparatus 100 can start playback from the position at which a particular person first appeared in the video content item selected by the user.

[Focused Playback]

Next, the operation of the video playback apparatus 100 in the case where the user selects focused playback shall be described.

Described simply, focused playback refers to playback in which specialized treatment is added, such as enlarged-display of a clipping of the video centering on the face of a particular person, or the like, when the particular person appears in the content item selected by the user.

Specifically, focused playback allows specialized treatment (adding effects) such as: brightening the entire screen when the particular person appears; spotlighting in which brightness is provided centering on the face of the particular person; and displaying the pre-registered name of a particular person in the vicinity of the person video of such person. In other words, focused playback refers to playback that causes the user to focus on such person by performing various processing on the playback target video.

It should be noted that, in addition, focused playback allows the addition of special treatment other than video effects, such as playing a particular sound every time the particular person appears.

When the user selects focused playback ("focused playback" in S110), the user subsequently selects an effect (S150). The video playback apparatus 100, as shown in FIG. 8, for example, generates a selection screen for selecting a focused playback effect, and causes the video display apparatus 800 to display the selection screen.

FIG. 8 is a diagram showing an example of a GUI (effect selection screen) for prompting the user to select an effect in the focused playback.

In the effect selection screen shown in FIG. 8, it is possible to select, from the types of focused playback, enlarged-playback where, when a particular person appears, enlarged-display of the video is performed centering on the face of the particular person.

Furthermore, with regard to the "enlarged-playback", there are three options depending on the degree of enlargement (enlargement factor). Specifically, there are, as options, "big" which has a large enlargement factor, "medium" which has an intermediate enlargement factor, and "small" which has minimal enlargement.

Furthermore, the user can select, in the effect selection screen in FIG. 8, "name display" in which the pre-registered name of a particular person is displayed in the vicinity of the person video of such person, and "spotlight playback" which adds the effect of putting a spotlight which provides brightness centering on the face of the particular person.

After selecting the effect to be applied in the focused playback as described above, the user selects the focus person (S160).

Figure 9:
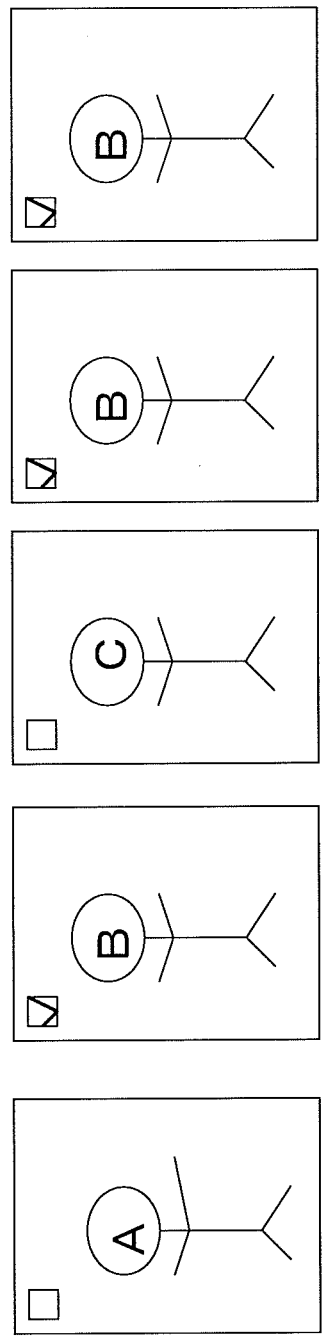
FIG. 9 is a diagram showing an example of a person selection screen displayed by the video playback apparatus.

As a screen to be used in this selection, a screen in which thumbnails of respective persons are lined up, such as that shown in FIG. 9, for example, is used.

Each of these thumbnails displays the face of one of the persons appearing in the video content item. It should be noted that, for the thumbnails to be used in the selection, it is preferable to use a size which allows the body of the person to just fit in by zooming out and displaying the face slightly smaller than the size with which the face detection unit 300 recognizes the face. In other words, it is easy for the user to select the person to be focused on.

In the person selection screen, a checkbox is provided at the upper left edge of each of the thumbnails to allow the user to select using the remote control 810.

When the user selects a checkbox and instructs the start of the playback of the video content item using the remote control 810, the video playback apparatus 100 performs focused playback while applying a focus effect on the particular person that is checked (S170).

It should be noted that although, in the person selection screen, the respective thumbnails are performed according to the recognition results of the face recognition unit 220, there are cases where, for example, depending on the capability of the face recognition unit 220, the same person is recognized as a different person.

For example, in FIG. 9, plural thumbnails showing person B are displayed because the face recognition unit 220 has judged that the person shown in each of these thumbnails are different persons.

However, through the user checking the respective thumbnails as described above, such plural persons recognized as different persons can be selected as the person targeted in the focused playback. In other words, in the video playback apparatus 100, the focus effect can be applied on a person in accordance with the preference of the user.

Furthermore, when plural persons are selected at the same time, the video playback apparatus 100 can apply the focus effect on each of these persons.

Subsequently, when the playback using the method selected in S110 ends, the playback operation by the video playback apparatus 100 ends (S180).

[Description of the Focused Playback Operation]

Figure 10A:
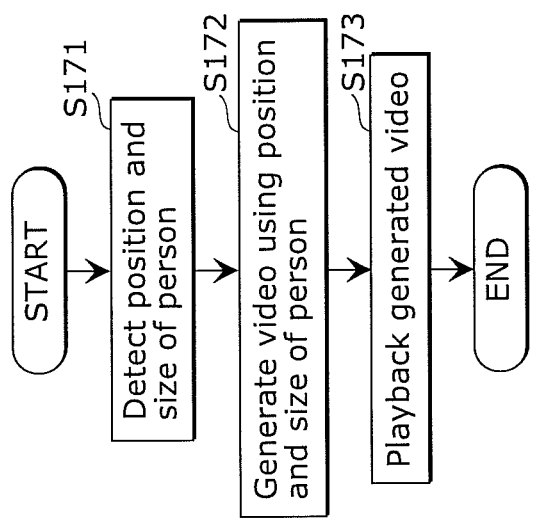
FIG. 10A is a flowchart showing an example of the flow of basic processes when the video playback apparatus performs focused playback.
Figure 10B:
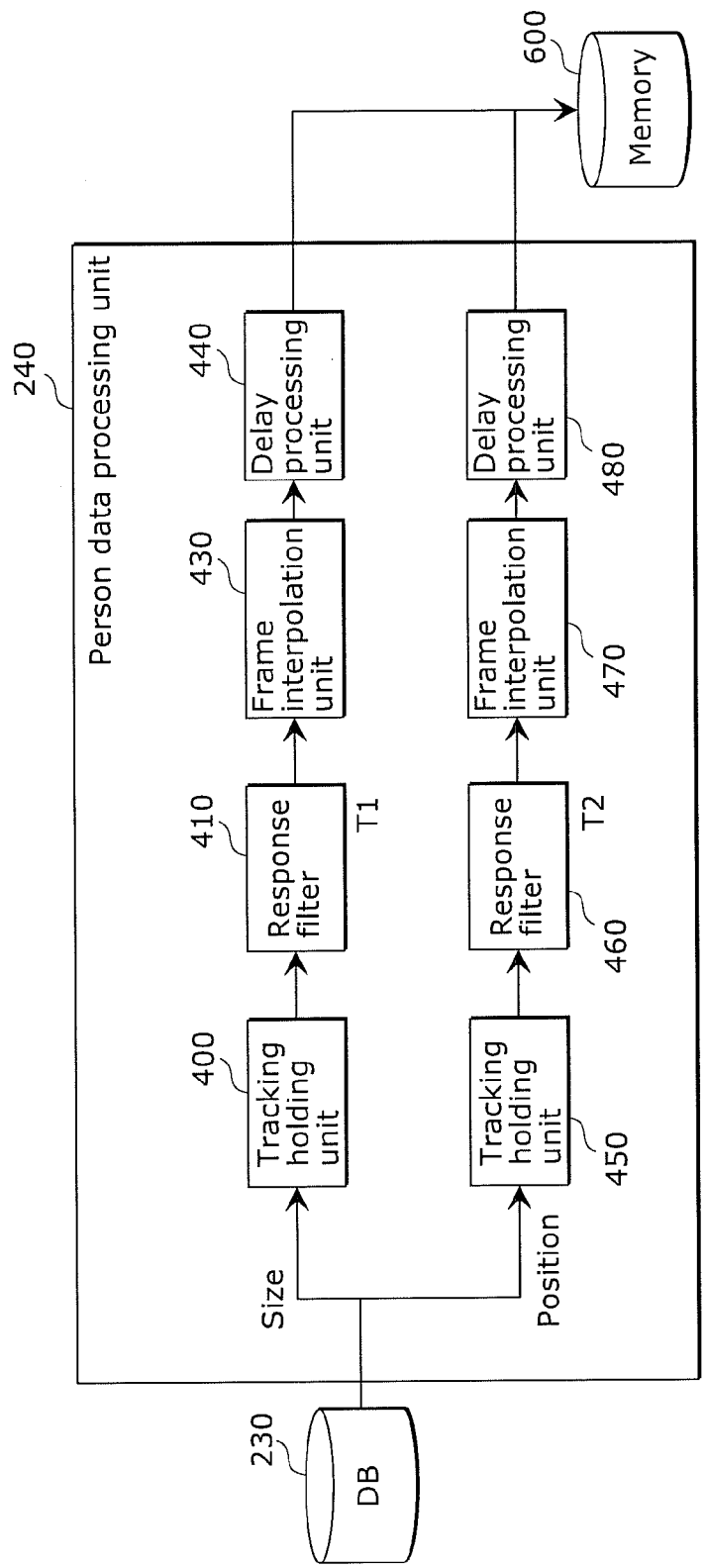
FIG. 10B is a block diagram showing a functional configuration of a person data processing unit in Embodiment 1.

Next, an example of the flow of a basic operation regarding the focused playback by the video playback apparatus 100 shall be described using FIG. 10A, and a configuration of the person data processing unit 240 shall be described using FIG. 10B.

FIG. 10A is a flowchart showing an example of the flow of basic processes when the person data processing unit 240 performs focused playback. It should be noted that FIG. 10A shows the flow of basic processes when the video playback apparatus 100 executes the aforementioned "enlarged playback".

As shown in FIG. 10A, the face recognition unit 220 detects the size and position of a person image appearing in the video, which change over time (S171).

The generation unit 204 generates a video to be played back (playback video) by applying processing on the input video so that the person image shown in the playback video is of a predetermined size (S172).

Specifically, the generation unit 204 determines the clipping range for a part of the video, in response to a change in the detected position of the person image. In addition, the generation unit 204 enlarges or reduces a partial video which is the part of the video shown in the determined clipping range, in response to a change in the detected size of the person image. Thus, the playback video is generated according to such a process.

Furthermore, in this embodiment, the response time for the determination of the clipping range by the generation unit 204 is longer than the response time for the enlargement or reduction of the partial video.

It should be noted that "response time is long (short)" can be stated differently as "response speed is slow (fast)", "response sensitivity is low (high)", "time constant of response is large (small)", or the like.

The video playback unit 260 plays back the video generated by the generation unit 204 (S173).

It should be noted that, in this embodiment, processing by the person data processing unit 240 is performed on the output from the face recognition unit 220 so as to control the response time (response sensitivity) for the processes such as clipping, and so on, by the generation unit 240.

Specifically, predetermined processing is performed on the output from the face recognition unit 220 so that the response time for a change in the position of the face image detected by the face recognition unit 220 in the determination of the clipping range by the generation unit 240 is longer than the response time for a change in the size of the face image detected by the face recognition unit 220 in the enlargement or reduction of the partial image.

Hereinafter, the functional configuration of the person data processing unit 240 shall be described with reference to FIG. 10B.

FIG. 10B is a block diagram showing the functional configuration of the person data processing unit 240.

In FIG. 10B, the face recognition data stored in the database 230 is divided into size data items indicating the sizes of a recognized face and position data items indicating the positions of the recognized face, and used in the processing of person data.

Size data items are inputted to a response filter 410 via a tracking holding unit 400, and are, in addition, processed by a frame interpolation unit 430 and a delay processing unit 440, and the processed data items are temporarily stored in a memory 600.

On the other hand, the position data items are inputted, via a tracking holding unit 450, to a response filter 460 to which a time constant different from the time constant set to the response filter 410 is set, and are processed by a frame interpolation unit 470 and a delay processing unit 480. The processed data items are temporarily stored in the memory 600

Subsequently, face recognition data (target information) indicating the changes in the size and position of the face image after the processing by the person data processing unit 240, which is temporarily stored in the memory 600, is inputted to the video playback unit 260.

The generation unit 204 of the video playback unit 260 clips out the partial video using the chronologically arranged position information items indicated in the inputted target information. The generation unit 204, in addition, enlarges or reduces the partial video in accordance with the chronologically arranged size information items indicated in the target information.

Specifically, the generation unit 204 enlarges the partial video to a predetermined size when the value indicated by a size information item is small. Furthermore, the generation unit 204 reduces the partial video to the predetermined size when the value indicated by a size information item is large.

For example, for a single frame in which the person (focus person) targeted in the focused playback is included, when the size of the face image of the focus person indicated in the target information is "50" and the predetermined size is "100", the partial video to be clipped from the frame is enlarged by a factor of 2. Furthermore, the enlarged partial video is trimmed to conform to the resolution of the video display apparatus 800 so as to fit within the display region of the video display apparatus 800, for example.

It should be noted that, when the size of the face image of the focus person is a relatively small value (for example, "10"), and partial video including the face image is enlarged by a factor of 10 to match the predetermined size (for example, "100"), it is possible that the face image becomes blurred. As such, when enlarging the partial video, the generation unit 204 of the video playback unit 260 performs enlargement at a predetermined multiplying factor or less.

Specifically, the above-mentioned predetermined size is not an absolute reference but rather a target value for displaying the face image (person image). By providing an upper limit to the enlargement factor, such as "a maximum factor of 5", the deterioration of image quality in the display of the face image (person image) can be suppressed.

Next, the operation of the respective structural elements of the person data processing unit 240 shown in FIG. 10B shall be described.

(Processing when Tracking is Interrupted)

When there is a segment in which the face recognition unit 220 is unable to detect a face or is unable, despite being able to detect a face, judge the face as being that of the focus person, that is, when the face recognition unit 220 is unable to continue tracking for the face recognition, the tracking holding units 400 and 450 each hold, for a certain period, data prior to the interruption of the tracking. The data held in such manner is treated as the data for the interruption segment, and, accordingly, temporal interpolation in the case where the tracking for the face recognition is interrupted is performed.

It should be noted that, since the interruption segment can be identified in advance from the data stored in the database 230, the aforementioned interpolation may be performed using the data immediately prior to the interruption and the data at the time of recovery from the interruption.

In this manner, by interpolating the data (position data and time data) at the time when tracking is interrupted, the enlarged-displaying by the video playback unit 260 does not immediately stop and the enlarged-display up to this point is maintained even when, for example, the face is suddenly hidden. As a result, it is possible to realize smooth movement in the playback video of the video playback apparatus 100.

The outputs of the tracking holding units 400 and 450 are respectively inputted to the response filters 410 and 460 which have different response times (time constants).

(Face Size Data Item Processing)

As described using FIG. 4B, with regard to the face size detection, matching verification, which is performed while shifting the overlapping position with the search-target image, is executed according to the number of face data items. Therefore, a significantly large number of face data items having different sizes cannot be used in the face size detection.

As such, the size of the face image of a single person, which is indicated in the face recognition data, changes in a discontinuous manner over time.

Figure 11:
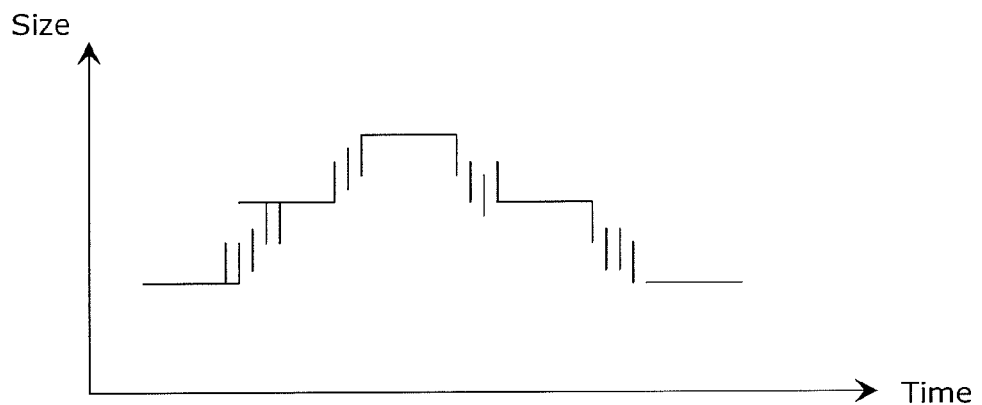
FIG. 11 is a graph an example of the change in the size of a face image over time.

FIG. 11 is a graph showing an example of the change in the size of the face image over time. It should be noted that FIG. 11 displays, for example, the change in the horizontal length of the face image. However, for the size of the face image, the vertical length of the face image may be used, and the length of the diagonal line of the rectangular face image may also be used.

As shown in FIG. 11, data included in the face recognition data and indicating the size of the face image is discontinuous with respect to the time axis, and the breadth of the change in the size of the face image is large, and thus judgment error is increased.

When the actual motion (shaking) of the face is considered as a movement of approximately 5 Hz to 30 Hz, the judgment error transitions at a high frequency (for example, 50 Hz to 100 Hz) compared to the movement of the face. As such, when video that is enlarged or reduced following the raw size data items corresponding to the face is inputted to the video display apparatus 800, the size of the face changes at a high frequency in the playback video, and, consequently, there is fine shaking of the contour of the face.

As such, this high frequency component is removed using the response filter 410.

Specifically, a value with which a component less than or equal to approximately 20 Hz is left and a response greater than or equal to approximately 50 Hz is removed, is set as a time constant T1 of the response filter 410.

Figure 12:
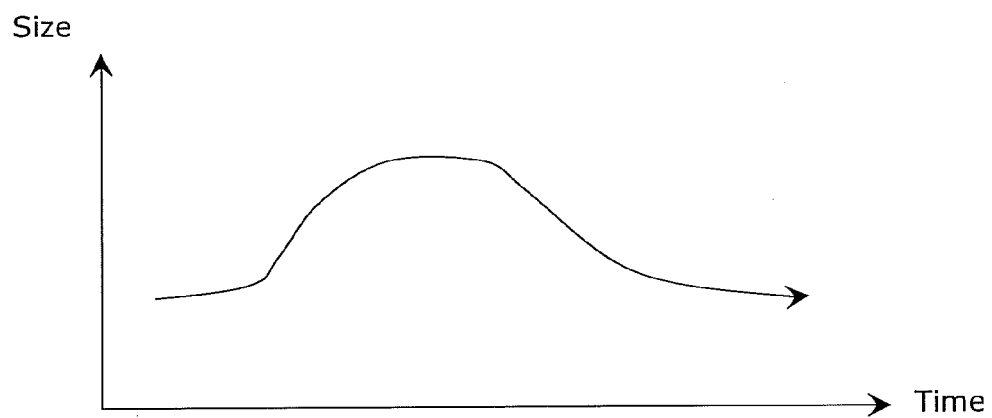
FIG. 12 is a graph showing an example of the change in the size of the face image after filter application.

Data indicating the change in the size of the face image, obtained in the above manner is shown in FIG. 12.

According to FIG. 12, it is possible to remove the noise caused by the difference in size between the matching data (face data items which are the subject of comparison (schematic diagram A3 in FIG. 4B)), and, as a result, the occurrence of fine shaking of the face image in the playback video is suppressed.

By way of the video playback unit 260 playing back the video by using the size data items obtained after the above-described processing, it is possible to suppress the occurrence of shaking at the high frequency of the face image in the video, and smooth playback can be realized.

More specifically, the size data items outputted from the response filter 410 are accumulated in the memory 600 after being further processed by the frame interpolation unit 430 and the delay processing unit 440.

The frame interpolation unit 430 generates, by interpolation from the size data items corresponding to discontinuous frames, a size data item corresponding to the frame located therebetween. This is due to the fact that the frames targeted for the face recognition by the face recognition unit 220 are not all the frames of the video to be processed but rather discontinuous frames.

In other words, if only the frames corresponding to the face recognition data outputted from the face recognition unit 220 are played back by the video playback unit 260, the number of frames to be played back would be small and, consequently, the playback video would be a shaky video. As such, the frame interpolation unit 430 interpolates the size data items corresponding to the thinned-out frames.

In this manner, since there are also cases where the face recognition data cannot be detected for each frame, using the face recognition data as-is for display results in the skipping of frames that should be displayed. In view of this, the frame interpolation unit 430 performs, by interpolation, a process of supplementing the data of the position information data item and size data item for each frame, based on the face recognition data outputted from the face recognition unit 220.

In other words, the process performed by the frame interpolation unit 430 is equivalent to applying a filter that oversamples at the per frame sampling rate, to the face recognition data which does not include information corresponding to part of the frames.

In this manner, the frame interpolation unit 430 interpolates the size of a face image corresponding to a frame located between two non-adjacent frames included in the input video to the video playback apparatus 100, by calculating the size of the face image using the size of the face image corresponding to each of the two non-adjacent frames.

Figure 13:
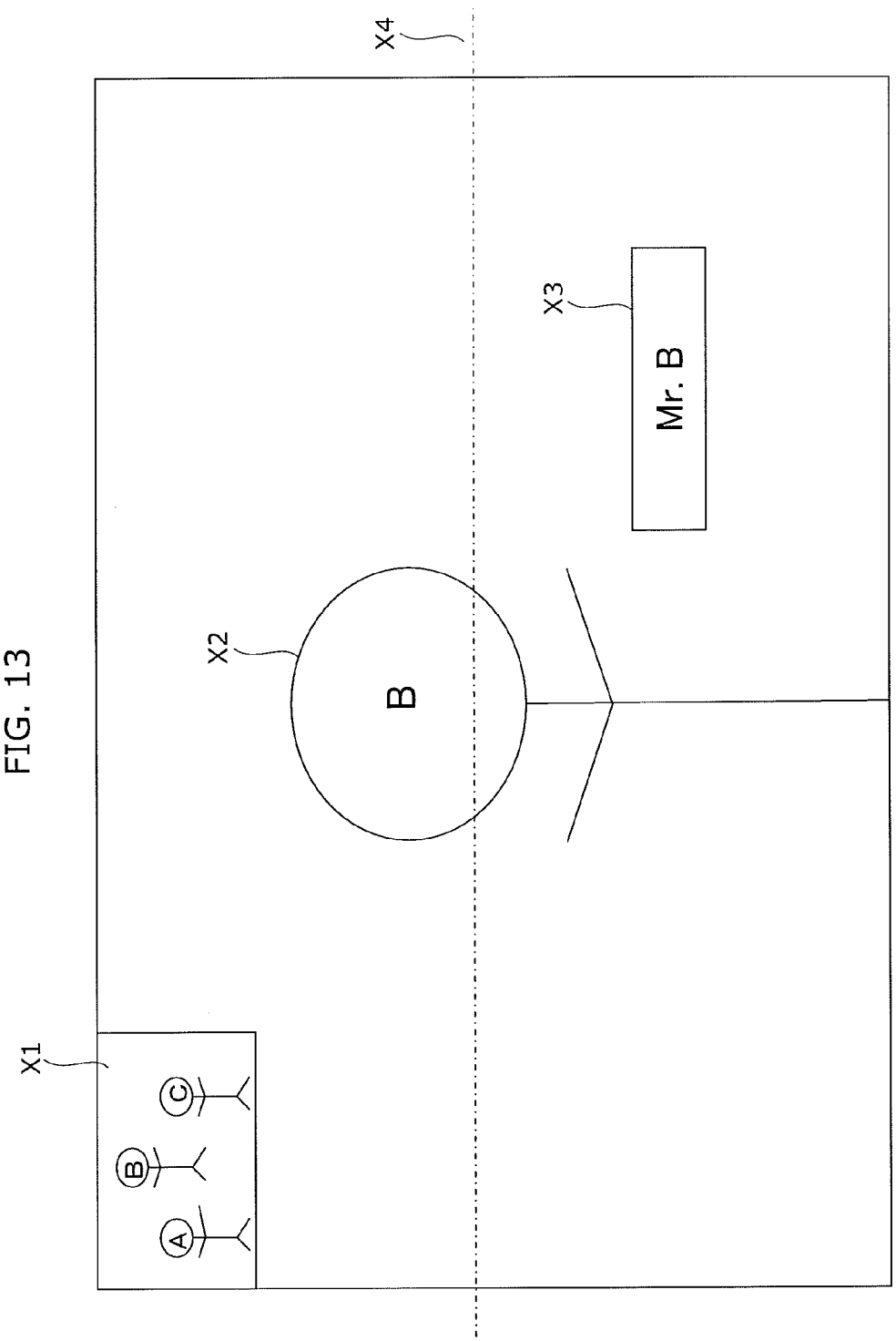
FIG. 13 is a schematic diagram showing an example of a video in focused playback, outputted by the video playback apparatus.

It should be noted that, as shown in FIG. 13 for example, the generation unit 240 in this embodiment generates a video obtained by overlapping a video X2 which is enlarged centering on the face of a particular person and an original image X1. When "name display" is selected for the focused playback (see FIG. 8), the generation unit 204 generates a video (display screen) obtained by further overlapping the name of the particular person ("Mr. B" in FIG. 13) such as that in X3.

In this manner, the video playback apparatus 100 performs enlarged-display of X2, as shown in FIG. 13. Specifically, even when plural persons appear in the video, the video playback apparatus 100 can identify a selected person by face detection and face recognition, and perform clipping and enlarged-display centering on the face of the selected person. In other words, the user can view a video content item, focusing on a particular person selected by the user.

At this time, the position data items outputted by the face recognition unit 220 are data items indicating a position of the center of the face, for example. However, in the actual enlarged-display by the generation unit 204, the center of the face is not the center of the enlargement, and the area around the neck, just below the face (the area around X4 in FIG. 13)

is the center of the enlargement. With this, a bust shot (an image from the bust up) of the person to whom the face belongs fits inside the playback video, and, consequently, a playback video with stronger impact can be obtained.

Since the data processing using the filter (response filter 410) having the time constant causes a commensurate delay in processing, the delay processing unit 440 corrects the delay by offsetting the sampling time at this point.

(Face Position Data Processing)

Meanwhile, the subsequent processing is performed on the position data of the face. Specifically, as shown in FIG. 10B, the output from the tracking holding unit 450 is inputted to the response filter 460 which is set with a time constant T2 (T2>T1) which is larger than the time constant T1 of the response filter 410 corresponding to the size of the face.

In other words, the output from the tracking holding unit 450 is inputted to the response filter 460 which only permissive of the low frequency.

Figure 14:
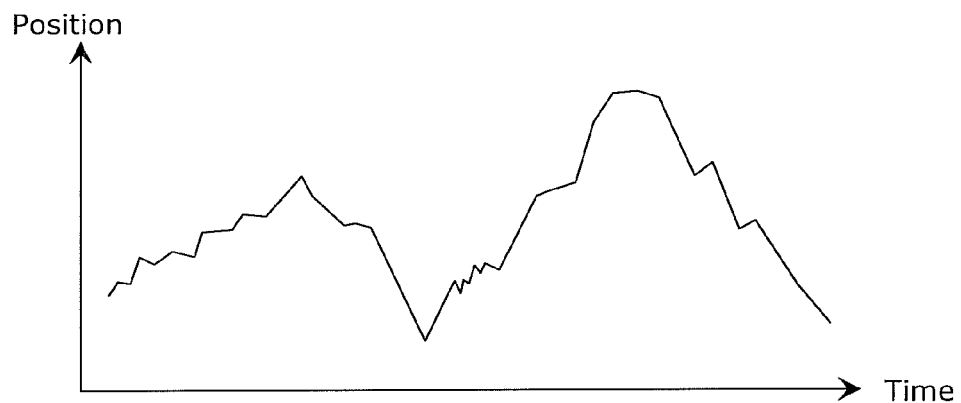
FIG. 14 is a graph showing an example of the change in the position of the face image over time.

FIG. 14 is a graph showing an example of the change in the position of the face image over time. It should be noted that FIG. 14 displays, for example, the change in the horizontal position of the face image. However, for the position of the face image, the vertical position of the face image may also be used.

As shown in FIG. 14, since the position data items included in the face recognition data and indicating the position of the face image include, for example, a camera-shake component, fine shaking appears. Furthermore, since there are instances where, in a dance scene, for example, the person focused on moves significantly and quickly, there are cases where the change in position of the face image of the person is steep and large.

As such, when video that is clipped following the raw position data items of the face image is inputted to the video display apparatus 800, the background of the focus person, for example changes at the high frequency in the playback video resulting in fine shaking of the background. Furthermore, when quick motion in the horizontal direction itself is the movement that focus person wishes to express, such movement is not sufficiently shown in the playback video.

As such, the high frequency component in the position change is removed using the response filter 460.

Specifically, a value for allowing a frequency of more or less 20 Hz to pass through is used as the time constant T2 of the response filter 460. This consequently suppresses the clipping of the partial video from following high frequency components such as the camera-shake component and the noise component, and this consequently suppresses the occurrence of shaking of the entire background screen of the focus person, in the playback video.

Figure 15:
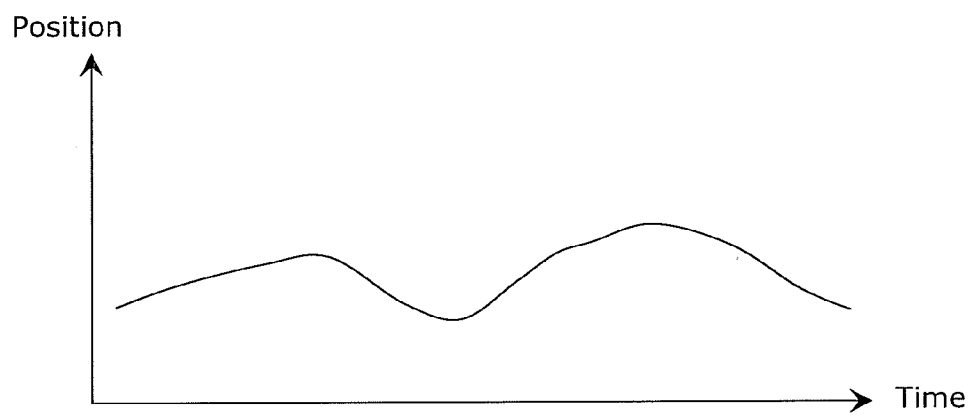
FIG. 15 is a graph showing an example of the change in the position of the face image after filter application.

Data indicating the change in the position of the face image, obtained in the above manner is shown in FIG. 15.

According to FIG. 15, it is possible to remove the noise caused by camera-shaking, or the like, at the time of image-capturing for example, and, as a result, the occurrence of fine shaking of the background image in the playback video is suppressed.

By way of the video playback unit 260 playing back the video by using the position data items obtained after the above-described processing, it is possible to suppress the occurrence of shaking at the high frequency of the background image in the video, and smooth playback can be realized.

More specifically, the position data items outputted from the response filter 460 are accumulated in the memory 600 after being further processed by the frame interpolation unit 470 and the delay processing unit 480.

In the same manner as the frame interpolation unit 430, the frame interpolation unit 470 generates the position data item for each frame, by interpolation from the position data items corresponding to discontinuous frames.

Specifically, the frame interpolation unit 470 interpolates the position of a face image corresponding to a frame located between two non-adjacent frames included in the input video to the video playback apparatus 100, by calculating the position of the face image using the position of the face image corresponding to each of the two non-adjacent frames.

Since the data processing using the filter (response filter 460) having the time constant causes a commensurate delay in processing, the delay processing unit 480 corrects the delay by offsetting the sampling time at this point.

A size data item and a position data item which are obtained through the processes described above are both outputted from the person data processing unit 240 and stored in the memory 600 together with a time stamp. A time stamp is data indicating the time of a video, and a presentation time stamp (PTS), and the like is used.

As described earlier, the data stored in the memory 600 is an example of target information and is read by the video playback unit 260.

Specifically, the video playback unit 260 performs processing on the video outputted by the decoder 250, based on the output of the person data processing unit 240. Specifically, the generation unit 204 of the video playback unit 260 clips a partial video from the output video from the decoder 250, according to the target information, and enlarges or reduces the clipped partial video. In this manner, by performing processing on the output video from the decoder 250, a playback video reflecting the target information can be obtained. Furthermore, in the video playback apparatus 100 in this embodiment, the position data items of a face obtained from a video content item which is the processing target are filtered by the response filter 460 which is more permissive of the low frequencies than the response filter 410 which processes the size data items of the face.

With this, a playback video centering on the focus person can be obtained and the shaking of the background screen of the person due to the camera-shake component, for example, can be suppressed. As a result, smooth playback of video centering on the focus person can be realized.

It should be noted that, as described earlier, when a value corresponding to approximately 20 Hz is used as the time constant T2 of the response filter 460, the planar movement of a person can be replicated to a certain extent.

However, when the response is slowed down excessively, the group delay of the response filter 460 becomes considerable, and, since the delay is prominent, a countermeasure such as slightly speeding up the data to be adjusted using the delay processing unit 480 becomes necessary.

Embodiment 2

Embodiment 2 in the present disclosure shall be described with reference to the drawings. The video playback apparatus 100 in Embodiment 2 is characterized in that a person data processing unit 241 is different from the person data processing unit 240 in Embodiment 1.

Specifically, aside from including a level detection unit 420, the person data processing unit 241 has the same configuration as the configuration of the person data processing unit 240 in Embodiment 1.

Figure 16:
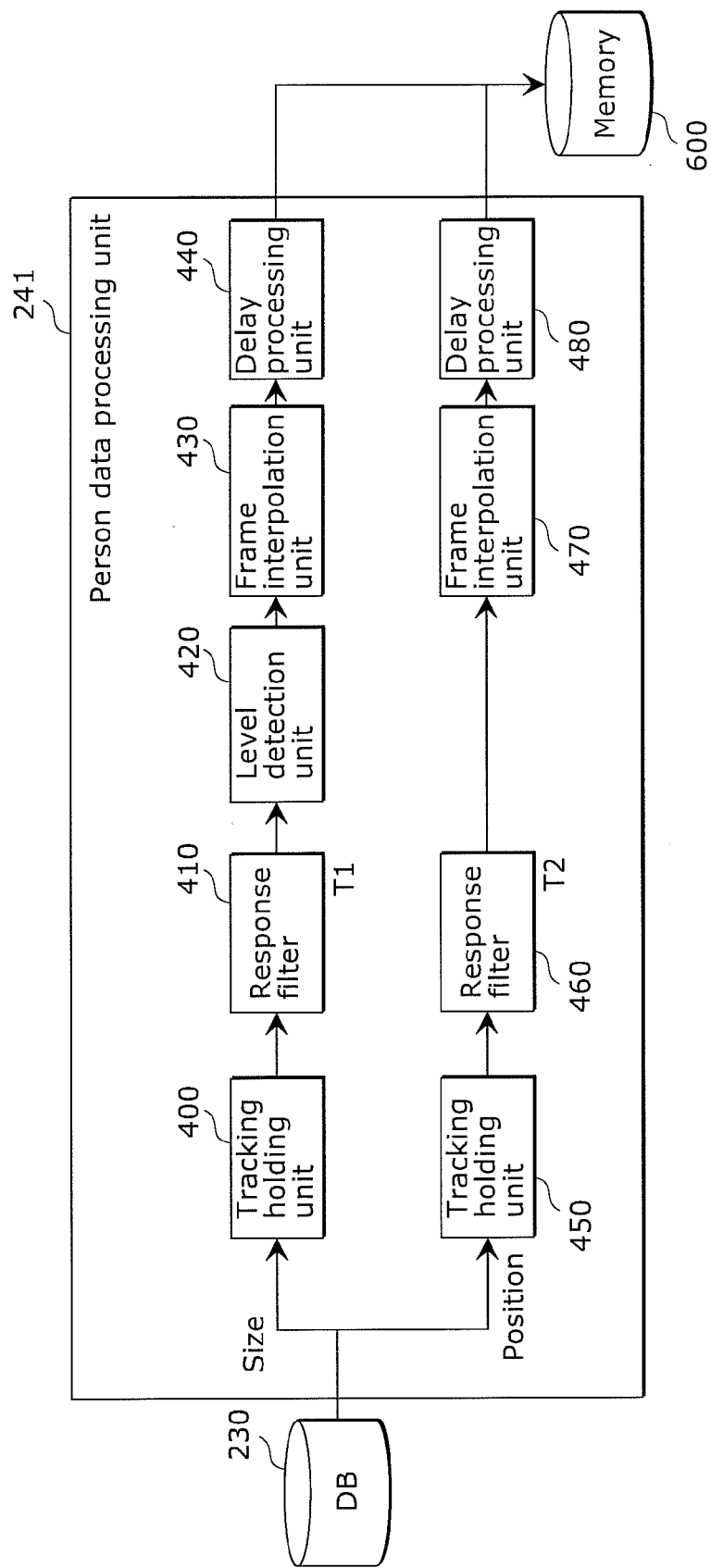
FIG. 16 is a block diagram showing a functional configuration of a person data processing unit in Embodiment 2.

FIG. 16 is a block diagram showing the functional configuration of the person data processing unit 241 in Embodiment 2.

In the person data processing unit 241 in Embodiment 2, the size data items outputted from the response filter 410 are supplied to the level detection unit 420, and the output of the level detection unit 420 is supplied to the frame interpolation unit 430.

Here, when the person which is the subject moves back and forth, the size of the face in the video changes, and when the face image is enlarged and reduced meticulously according to such size, it becomes impossible to express the back and forth movement of the face of the subject. As a result, the expression of the movement of the person is lost.

As such, in the person data processing unit 241 in Embodiment 2, the threshold for the change in the size of the face is changed depending on the time. Specifically, there is provided a threshold which is time-variable such that the value of the initial threshold in a period is larger than the value of the final threshold in the period.

In other words, when the amount of change in the size of the face image with reference to a predetermined point in time (for example the difference between the current size and the size at the point in time when the focus person first appeared) is less than or equal to a first threshold, the person data processing unit 241 in Embodiment 2 maintains the change as is, without finely adjusting (enlarging or reducing) the size of the partial video according to the size of the face image. Furthermore, when the amount of change exceeds the first threshold, the generation unit 204 in Embodiment 2 performs an operation to enlarge or reduce the partial video so that the size of the face image assumes the predetermined size.

By operating in such manner, the abrupt fluctuation in the size of the face (size of the face image) can be rendered to allow reflection thereof in the playback video.

Specifically, at the point when the size changes, the level detection unit 420 in FIG. 16 performs level judgment to abruptly change the size of the face in the playback video, based on the size data items (for example, see FIG. 12) of the face image outputted from the response filter 410.

More specifically, the level detection unit 420 rewrites the size data items that are inputted so that the size of the face image fluctuates abruptly when the amount of change in the size exceeds the first threshold. In addition, in the case of causing the size of the face image to change once, the level detection unit 420 rewrites the size data items that are inputted so that the size of the face data does not return to the original value (value indicated in the size data items at the time of input) unless the subsequent amount of change becomes less than or equal to a second threshold (second threshold<first threshold).

In other words, when enlargement or reduction of the partial video is performed, the generation unit 204 in Embodiment 2 maintains the enlarged or reduced state until the amount of change subsequently becomes less than or equal to the second threshold. Furthermore, when the amount of change becomes less than or equal to the second threshold, the generation unit 204 generates the playback video in such a way that the size of the face image assumes the value of the size data items at the time of input.

In this manner, the person data processing unit 241 in Embodiment 2 performs what is called hysteresis control on the size of the face image.

Figure 17:
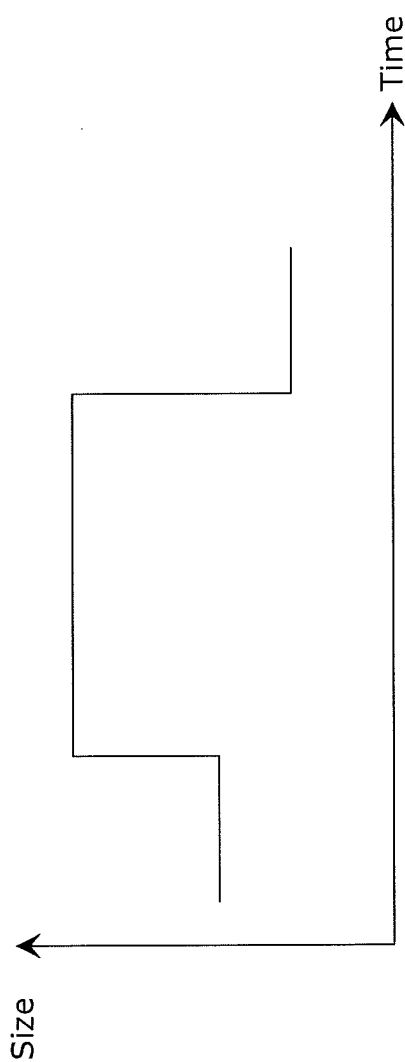
FIG. 17 is a graph showing an example of the change in the size of a face image after level judgment by the person data processing unit in Embodiment 2.

The change in the size of the face image after the level judgment for such hysteresis control is shown in FIG. 17.

In this manner, in the video playback apparatus 100 in Embodiment 2, the continuous data items outputted from the response filter 410 are rewritten into abruptly fluctuating data items by the level detection unit 420. Accordingly, even when the input video is actually video captured at a fixed multiplying factor, for example, it is possible to output a playback video incorporating an effect simulating abrupt zooming-in of the camera during video capturing.

In other words, with regard to the change in the size of the face, it is acceptable not to follow a small change, and to rapidly enlarge or reduce an image centering on the face when the change is big. With this, it is possible to create a video that approaches the camerawork of a professional camera man, and imparts a strong impact during playback.

(Advantageous Effects, and so on)

In the video playback apparatus 100 in Embodiments 1 and 2, each of (i) the size data items and (ii) the position data items of the person image which are obtained through face detection and face recognition are filtered using separate time constants, and the respective filtered data items are inputted to the playback unit. With this, when performing enlarged-playback focusing on a particular person, for example, shaking at the high frequencies of the contour and background of the face of the person can be suppressed, and thus smooth enlarged playback can be realized.

Furthermore, according to the video playback apparatus 100, it is possible to obtain, from inputted video, a playback video centering on a person that was not focused on at the time the video was captured.

For example, assuming the case where a video, in which person A and person B appear and which was shot following person A, is inputted to the video playback apparatus 100. In this case, when the video is played back through normal playback, the video is played back centering on person A. However, by selecting person B as the focus person and selecting focused playback during the playback of the video, a playback video centering on person B can be obtained.

(Other Embodiments)

As described above, Embodiments 1 and 2 are described as examples of the technique disclosed in the present application. However, the technique in the present disclosure is not limited to such embodiments, and is also applicable to embodiments obtained by carrying out modification, substitution, addition, and omission as necessary. Furthermore, it is also possible to obtain a new embodiment by combining respective structural elements described in Embodiments 1 and 2.

In view of this, other embodiments shall be given as examples, below.

For example, in Embodiment 1, the response time for the determination of the clipping range by the generation unit 204 is longer than the response time for the enlargement or reduction of partial video.

However, the response time for the determination of the clipping range by the generation unit 204 may be made shorter than the response time for the enlargement or reduction of partial video. In other words, the response time for the enlargement or reduction of partial video may be made longer than the response time for the determination of the clipping range.

Furthermore, the magnitude relationship between the response time for the determination of the clipping range by the generation unit 204 and the response time for the enlargement or reduction of partial video may be switched according to an instruction from the user for example.

For example, when the back and forth movement of the focus person is an important movement, the video playback apparatus 100 makes the response time for the enlargement or reduction of partial video longer than the response time for the determination of the clipping range, based on an instruction from the user. Accordingly, even when the focus person repeatedly moves back and forth in short cycles while moving left and right, it is possible to obtain a playback video which clearly shows the fine back and forth movement.

Furthermore, when the response time for the determination of the clipping range is made short enough to follow the camera-shake, vertical and horizontal shaking of the person due to camera-shake can be suppressed, thus allowing playback of video which is more focused on the person.

Furthermore, in Embodiment 1, the respective structural elements included in the video playback apparatus 100 which are related to focused playback (i.e., the face recognition unit 220, the person data processing unit 240, the generation unit 204, and the video playback unit 260, etc.) are realized by the microcomputer 180. Specifically, each of these structural elements are realized by software such as a program executed by a computer equipped with a CPU, a random access memory (RAM), a read only memory (ROM), a communication interface, and so on. However, each of these structural elements may be realized by hardware such as an electronic circuit, or the like.

As described above, embodiments are described as examples of the technique in the present disclosure. The accompanying drawings and detailed description are provided for such purpose.

Therefore, the structural elements disclosed in the accompanying drawings and detailed description may include not only structural elements necessary for solving the problem, but also structural elements for exemplifying the aforementioned technique, which are not essential to solving the problem. As such, description of these non-essential structural elements in the accompanying drawings and detailed description is not intended to acknowledge essentiality of these non-essential structural elements.

Furthermore, since the above described embodiments are for exemplifying the technique in the present disclosure, various modifications, substitutions, additions, and omissions can be carried out within the scope of the claims and their equivalents.

The herein disclosed subject matter is to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

The present disclosure is applicable to apparatuses which can perform processing on video captured by a home video camera for example, and play back the processed video. Specifically, the present disclosure is applicable to video display apparatuses and video playback apparatuses such as recorders, tablet terminals, and so on.

The invention claimed is:

1. A video playback apparatus that performs processing on an obtained video and plays back the video after the processing, the video playback apparatus comprising:
   a detection unit configured to detect a size and a position of an image of a person appearing in the video, the size and the position changing over time;
   a generation unit configured to generate a playback video that is to be played back, in such a way that the image of the person to be shown in the playback video is of a predetermined size, by (i) determining a clipping range for a part of the video in response to a change in the detected position of the image of the person, and (ii) enlarging or reducing a partial video in response to a change in the detected size of the image of the person, the partial video being the part of the video shown in the clipping range; and
   a playback unit configured to play back the playback video generated by the generation unit,
   wherein a response time for the determination of the clipping range by the generation unit is longer than a response time for the enlargement or the reduction of the partial video,
   the video playback apparatus further comprises a person data processing unit configured to perform predetermined processing on the respective changes in the size and the position of the image of the person detected by the detection unit, and generate target information which is information indicating the respective changes in the size and the position of the image of the person after the predetermined processing,
   wherein the person data processing unit is configured to perform the predetermined processing so that the response time for the determination of the clipping range by the generation unit with respect to the change in the position of the image of the person detected by the detection unit is longer than the response time for the enlargement or the reduction of the partial video with respect to the change in the size of the image of the person detected by the detection unit, and
   the generation unit is configured to perform the determination of the clipping range and the enlargement or the reduction of the partial video according to the target information generated by the person data processing unit.

2. The video playback apparatus according to claim 1, wherein the person data processing unit includes an interpolation unit configured to interpolate a size and a position of an image of the person after the predetermined processing, and
   the interpolation unit is configured to interpolate the size and the position of the image of the person by calculating a size and a position of the image of the person corresponding to a frame located between two non-adjacent frames included in the obtained video, using sizes and positions of the image of the person corresponding to the two non-adjacent frames.

3. A video playback method executed by a video playback apparatus, the video playback method comprising:
   obtaining a video;
   detecting a size and a position of an image of a person appearing in the obtained video, the size and the position changing over time;
   generating a playback video that is to be played back, in such a way that the image of the person to be shown in the playback video is of a predetermined size, by (i) determining a clipping range for a part of the video in response to a change in the detected position of the image of the person, and (ii) enlarging or reducing a partial video in response to a change in the detected size of the image of the person, the partial video being the part of the video shown in the clipping range; and
   playing back the generated playback video,
   wherein a response time for the determination of the clipping range is longer than a response time for the enlargement or the reduction of the partial video,
   the video playback method further comprises performing predetermined processing on the respective changes in the detected size and the detected position of the image of the person, and generating target information which is information indicating the respective changes in the size and the position of the image of the person after the predetermined processing, the predetermined processing is performed so that the response time for the determination of the clipping range with respect to the change in the detected position of the image of the person is longer than the response time for the enlargement or the reduction of the partial video with respect to the change in the detected size of the image of the person, and the determination of the clipping range and the enlargement or the reduction of the partial video is performed according to the generated target information.

\* \* \* \* \*

UNITED STATES PATENT AND TRADEMARK OFFICE
CERTIFICATE OF CORRECTION

PATENT NO. : 9,111,363 B2  
APPLICATION NO. : 14/064253  
DATED : August 18, 2015  
INVENTOR(S) : Akira Matsubara Page 1 of 1

It is certified that error appears in the above-identified patent and that said Letters Patent is hereby corrected as shown below:

Title Page, below Item (65)

Please insert the item (30) information as follows:

--(30)      Foreign Application Priority Data

March 25, 2013     (JP)     2013-061416--

Signed and Sealed this
Twenty-first Day of June, 2016

Michelle K. Lee
*Director of the United States Patent and Trademark Office*